United States Patent [19]
Horve et al.

[11] 3,773,454
[45] Nov. 20, 1973

[54] APPARATUS FOR PRECISION INJECTION MOLDING OF COMPOSITE PARTS

[75] Inventors: Leslie A. Horve, Hanover Park; Jerry D. Reichenbach, Carpentersville; Kenneth F. Gabrys, Streamwood, all of Ill.

[73] Assignee: Chicago Rawhide Manufacturing Company, Elgin, Ill.

[22] Filed: Sept. 20, 1971

[21] Appl. No.: 181,859

[52] U.S. Cl............... 425/242, 425/129, 425/420, 425/DIG. 42, 425/DIG. 60
[51] Int. Cl............................................... B29f 1/00
[58] Field of Search.................... 425/468, DIG. 42, 425/DIG. 47, DIG. 51, DIG. 58, DIG. 59, DIG. 60, 129, 125, 124, DIG. 812, 806, 242, 247, 249, 298, 299, 302, 420

[56] References Cited
UNITED STATES PATENTS

| | | | |
|---|---|---|---|
| 3,405,201 | 10/1968 | Roach.......................... | 425/DIG. 60 |
| 2,983,958 | 5/1961 | Fay .................................. | 425/806 |
| 3,349,155 | 10/1967 | Valyi................................ | 425/468 X |
| 3,475,790 | 11/1969 | Bush et al. ................... | 425/DIG. 47 |
| 3,241,193 | 3/1966 | Pohlman...................... | 425/DIG. 47 |
| 3,341,647 | 9/1967 | Aberle ......................... | 425/DIG. 47 |
| 3,351,691 | 11/1967 | Wilford........................... | 425/468 X |

FOREIGN PATENTS OR APPLICATIONS
962,726  12/1949  France............................. 425/468

*Primary Examiner*—J. Spencer Overholser
*Assistant Examiner*—Michael O. Sutton
*Attorney*—James T. FitzGibbon

[57] ABSTRACT

Molds and methods for injection molding of precision composite articles. The molds are particularly adapted for use in making highly precise oil seals having a rubber body or lip bonded to a metal mounting flange. According to the invention, means are provided in the molds for precise centering of mold parts, for insuring predetermined flow patterns of the rubber during molding, for venting gases formed during molding, for evacuating the molding cavity before it is filled with fluent rubber, and for directing the material flow so as to fill the molding cavities completely. Certain preferred mold constructions include relatively movable parts for permitting cavity evacuation and for eliminating "flash", while others include full circumference, diaphragm or so-called umbrella type runner systems. The molds are arranged to facilitate tearing of the rubber scrap from the finished part along a predetermined line as the mold parts open for part removal. The methods include flowing the rubber through various passages under controlled conditions to manufacture parts of uniform quality.

15 Claims, 11 Drawing Figures

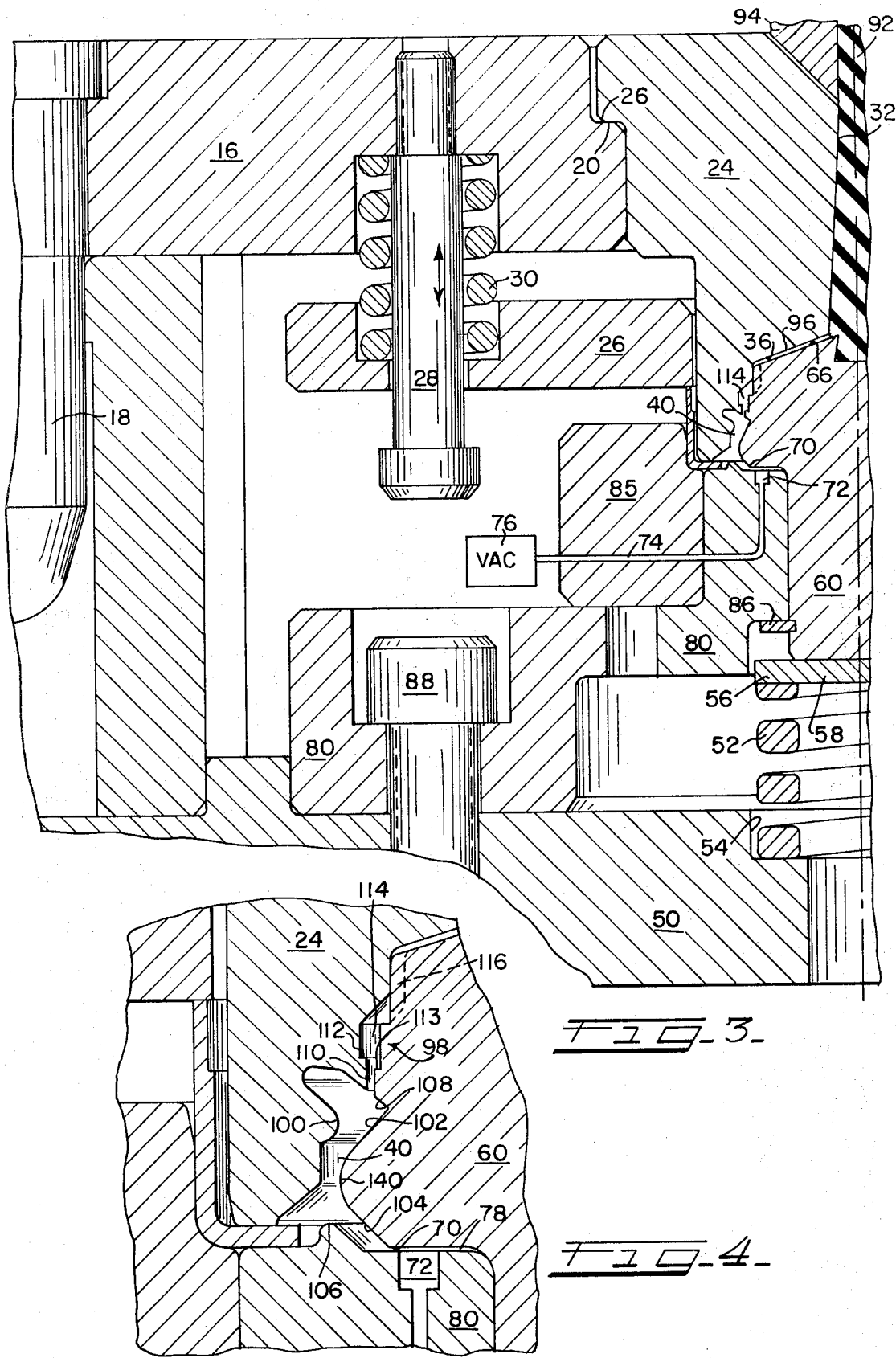

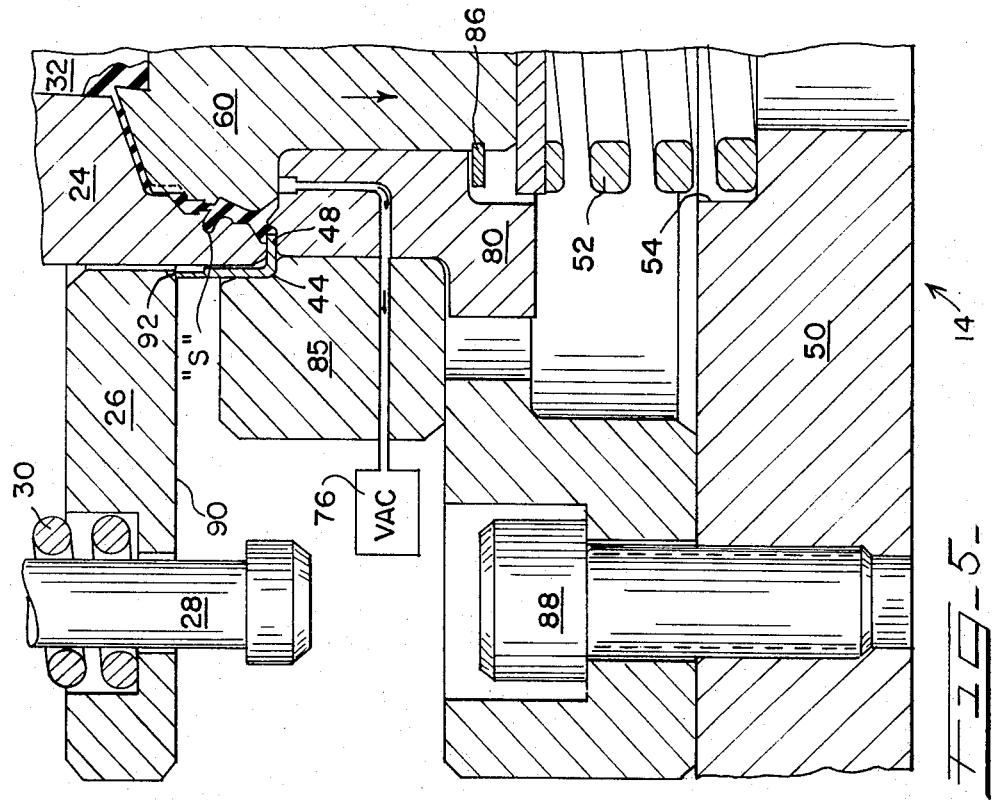
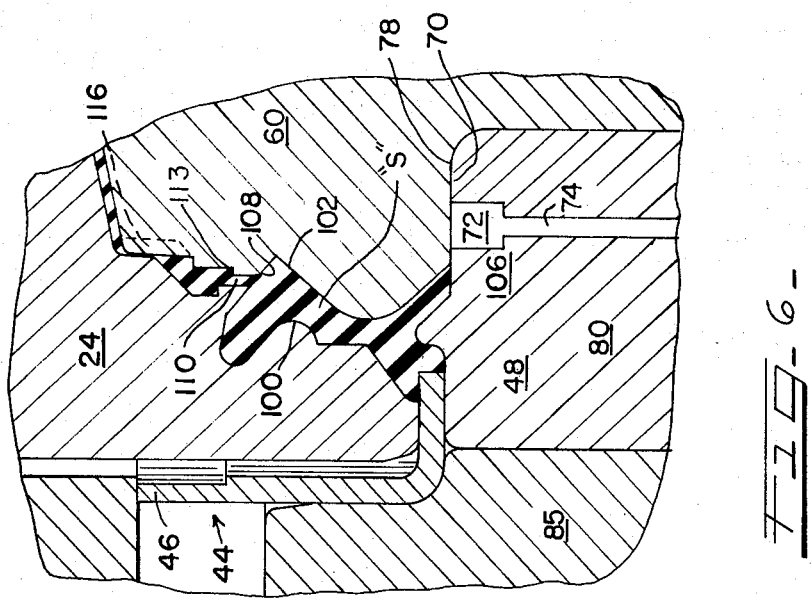

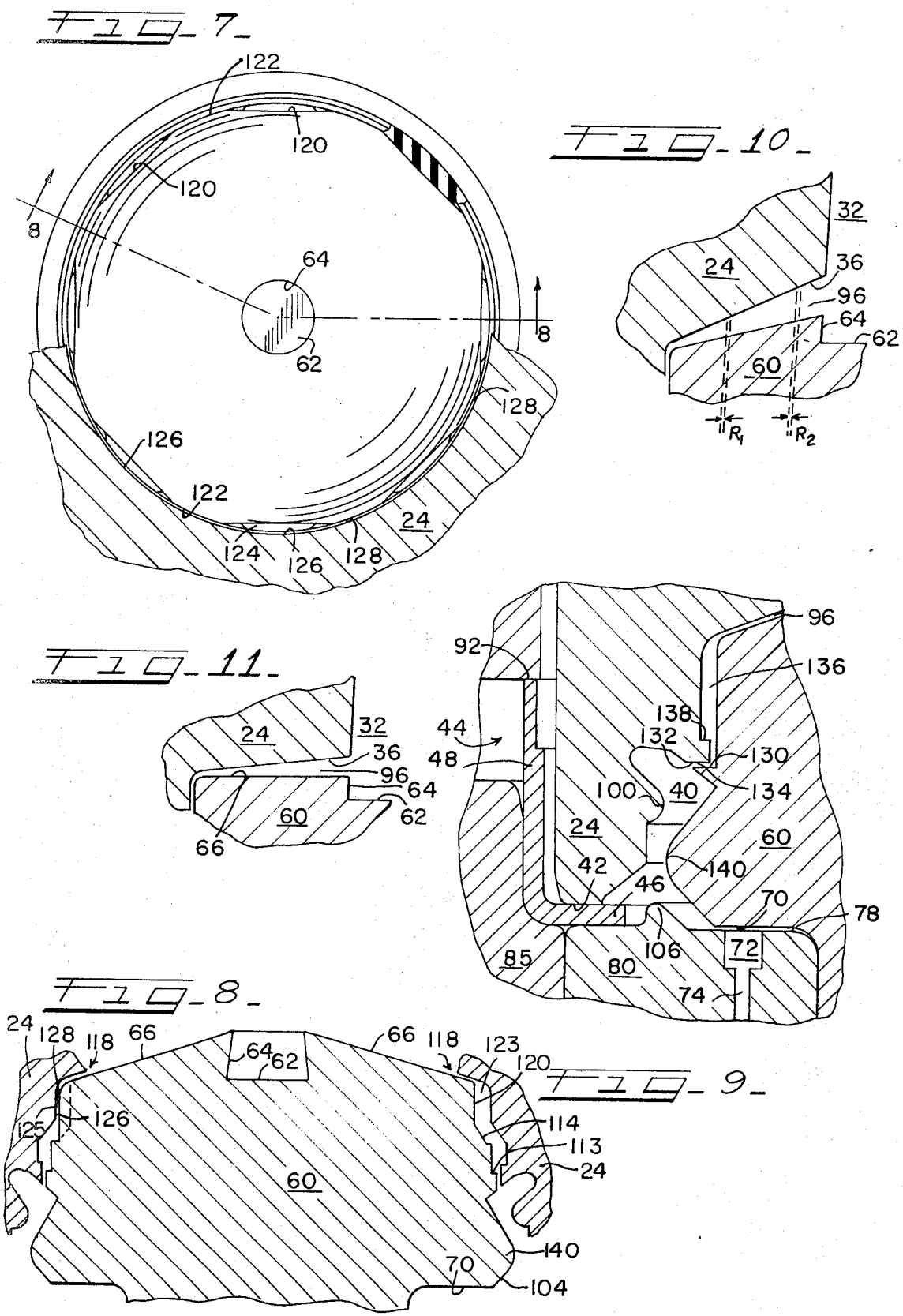

APPARATUS FOR PRECISION INJECTION MOLDING OF COMPOSITE PARTS

BACKGROUND OF THE INVENTION

The present invention relates to molding of fluent materials, and in particular, to apparatus and methods for injection molding of precision made articles manufactured on a mass production basis. In keeping with the invention, molds are provided which include means for establishing particularly desirable flow patterns of the material from the time the material is forced from the injection head until it enters the molding cavity. These flow characteristics are brought about in molds which are also designed so as to include provisions for tearing or separating the completed part from the scrap portion of the rubber of other moldable materials which is to be discarded. Furthermore, the molds of the invention are designed so as to include means for maintaining a vacuum on certain portions of the mold cavity to facilitate complete filling of the mold. In some such cases, one or more parts are made with provision for slight relative movement therebetween to permit rubber and gas flow to take place during an intial portion of the molding cycle, and thereafter to move under the pressure of the fluent rubber to a sufficiently closed position to prevent liquid rubber from entering certain parts of the mold.

Furthermore, means are provided in the molds of the invention for achieving the advantage of uniform flow of moldable material prior to initial curing or vulcanization thereof, while centering various cooperating portions of the mold to assure concentricity of the mold parts forming the molding cavity.

Whereas the invention has a number of applications, it will be illustrated by reference to the production of improved oils seals, which are commonly made of curable elastomeric materials such as nitrile, acrylate, and silicone rubbers, as well as more conventional synthetic and natural rubbers. Referring now to characteristic practices in the oil seal art, compression and transfer molding have been very commonly used, while injection molding has not heretofore been adapted on a significant scale in this industry, particularly for the manufacture of relatively large parts. The reason for this has been that the injection molding of curable parts involves problems which are difficult to overcome.

In the manufacture of a typical oil seal, it is necessary that the mold unit be precisely formed, since seals are often made to tolerances of single or perhaps fractional thousandths of an inch, and are intended to be positioned on highly precise parts made to fine tolerances. Once in place, oil seals are expected to last for extended periods, commonly ranging up to many thousands of operating hours, and hundreds of thousands of vehicle and aircraft miles, for example. Accordingly, when seals are mass produced, as is ncessary for economy of manufacture, it is necessary that the seals be characterized by great uniformity of dimension. Moreover, a very important characteristic of oil seals of the synthetic rubber type is that the finished elastomeric material be very uniform throughout its entire extent. This is necessary because the finished part must exhibit uniform properties of flexure and wear in order to be considered satisfactory.

Referring more particularly to prior art problems which have existed in the injection molding of oils seals, it is common for an improperly molded part to display so-called flow lines or knit lines, such as where premature curing of an advancing portion or front of the molding charge has developed a cured or "skin" portion which does not readily bond to an adjacent portion of the molding charge. As a result, the interface between these areas displays poor adhesion, or is much more brittle, or is otherwise of a much different texture than the surrounding material. Commonly, leaks occur where these interfaces lie on an intended line of sealing contact on an associated shaft. Furthermore, materials, characterized by an exterior skin of a scorched or precured material tend not to fill mold cavities completely, leaving voids or pock marks which also tend to cause leakage along an associated shaft.

Another common problem with injection molding has been the lack of success in venting not only air entrapped in the mold but also various gases which are formed during the rubber curing reactions. The inclusion of gases, particularly under high injection pressures, tends to create a product which is non-uniform and which is not satisfactory for high quality oil seal applications.

Inasmuch as injection molding involves rapid flow of a significant volume of material through relatively small orifices, it is also quite often necessary to insure that the mold parts defining these orifices are disposed in virtually exact concentricity. If not, flow from the sprue, diaphragm or other runner area into the molding cavity will be irregular or non-existent, and in some cases the finished part will lack dimensional uniformity. Another desirable type of molded oil seal, but one which has not commonly been able to be achieved in practice, is a so-called molded lip type, that is, a type wherein the effective or working area or seal band of the sealing lip is formed entirely by molding rather than by molding only a portion thereof and cutting the remainder of the seal body away to form a so-called trimmed lip seal. Constructions of the molded lip sort call for a number of undercut areas and the like which are difficult to fill, and accordingly, it is necessary that the mold design be such that fluent moldable materials, such as rubbers, are directed into and are able to fill otherwise inaccessible areas of the molding cavity.

In view of the foregoing characteristics and advantages desired for use in molding apparatus and methods, it is an object of the present invention to provide an improved mold apparatus and method.

It is another object to provide molds which are useful with an injection molding technique to form composite fluids seals of very high quality.

Another object is to provide a molding apparatus and method which will insure concentricity of mold parts during manufacture of the part for increased quality thereof and to aid in proper sizing of the parts.

Another object is to provide a mold unit which makes separation of the finished part from the scrap portion very easy, and which confines the area of separation to a predetermined portion of the seal.

Another object is to provide a molding apparatus wherein certain flow characteristics are inherently imparted to the rubber or other moldable product as it passes from a point of mold entry into the molding cavity.

Another object is to provide a multi-part mold which provides for uniform flow of fluent material into the molding cavity and wherein the mold parts are also inherently self-centering.

A further object is to provide a mold construction wherein a part of the mold is permitted to move between a first position permitting rapid evacuation of air and gases from the mold cavity to a second position permitting a limited rate of gas evacuation and which provides a positive barrier against the formation of rubber scrap or flash.

Another object is to provide a mold apparatus which provides means for centering the mold parts relative to one another without additional exterior means to accomplish this Another object is to provide a mold having a runner or flow pattern in the form of a 360° or substantially completely circular, disc-like "umbrella" or diaphragm through which rubber flows prior to entering the molding cavity.

A still further object is to provide a mold construction which utilizes an inlet for the mold cavity which also serves to trim the finished part by tearing it upon axial movement of the mold parts, and wherein the portion to be torn lies in a radial plane.

Another object is to provide a mold unit wherein trimming of the finished part by tearing is accomplished along an annular area having a substantial axial extent.

Another object is to provide a mold with an umbrella or diaphragm type single runner system wherein the diaphragm is of gradually decreasing thickness throughout its extent, whereby a more uniform finished part may be produced.

Another object is to provide a method of manufacturing molded parts which includes flowing fluent material prior to curing through a diaphragm or other fully circular passage and through areas of reduced cross section into molding cavities from which the parts may be readily removed in a substantially finished state.

These and other objects and advantages of the invention, including certain inherent objects and advantages thereof, are accomplished by providing a mold having a molding cavity, means for receiving a charge of fluent material under an injection pressure, and means for distributing the charge of material to the molding cavity about the entire periphery of the molding cavity, whereby a more attractive, uniform and better quality seal may be manufactured.

The manner in which these objects and advantages are achieved in practice will become more apparent when reference is made to the accompanying detailed description of the preferred embodiments of the invention set forth by way of example and shown in the accompanying drawings, wherein like reference numerals indicate corresponding parts throughout.

BRIEF DESCRIPTION OF THE DRAWINGS

FIG. 3 is a section view, with portion broken away, showing the mold of FIGS. 1 and 2 in the fully closed position;

FIG. 4 is a fragmentary view of the molding cavity portion of the mold of FIG. 3, shown on a further enlarged scale and depicting certain detailed features of the mold of the invention;

FIG. 5 is a fragmentary sectional view showing the closed mold of FIGS. 1–4 and showing the product passages and the molding cavity being filled with a fluent rubber product;

FIG. 6 is an enlarged sectional view of a portion of the apparatus of FIG. 5, showing the molding cavity filled with rubber material and the associated portions of the mold in greater detail;

FIG. 7 is a plan view, with portions broken away, of one form of core unit used in a mold made according to the invention;

FIG. 8 is a vertical sectional view, with portions broken away, of the core unit of FIG. 7 and taken along lines 8—8 thereof;

FIG. 9 is an enlarged, fragmentary view of a portion of a modified form of mold incorporating certain features of the invention;

FIG. 10 is an enlarged fragmentary vertical sectional view of a portion of one form of mold of the invention, showing one of the features thereof on an exaggerated scale; and FIG. 11 is an enlarged fragmentary view of a portion of still another form of mold made according to the invention.

DESCRIPTION OF THE PREFERRED EMBODIMENTS OF THE INVENTION

Although it will be understood that the principles of the present invention may be otherwise applied, a description of the invention will be made by reference to certain preferred embodiments wherein the material to be injection molded is a rubber material, and wherein the articles to be manufactured is a composite product, that is, an oil seal having a metal stamping portion to which a rubber body or lip portion will be bonded as the rubber body portion is simultaneously formed in the mold by the process of the invention. It will also be understood, that when expressions indicating direction or orientation are used, they are used without limitation or implication that the invention requires such positions to operate, it being understood by those skilled in the art that such positions or orientations are not ordinarily significant unless otherwise indicated.

Figure 1:
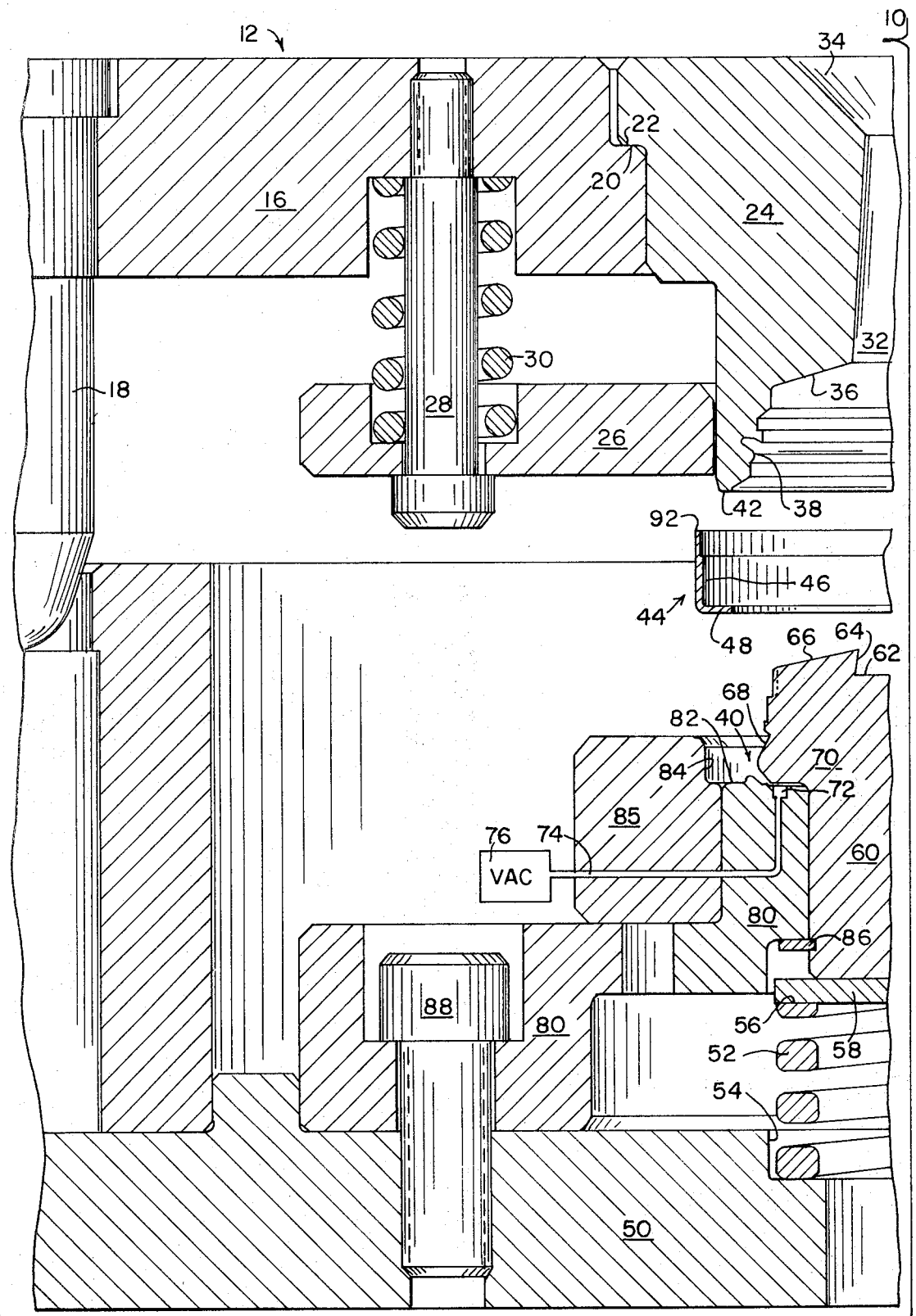
FIG. 1 is a vertical sectional view, with portions broken away, showing an injection mold made according to the present invention and showing the principal parts thereof in an exploded relation, including the stamping to which the formed rubber portion will be bonded.

Referring now to the drawings in greater detail, FIG. 1 is an exploded view of a mold unit generally designated 10 and which is shown to include a top assembly 12 and a bottom assembly 14, with the top assembly 12 including a top plate 16 having a plurality of centering pins 18 disposed about the periphery thereof and including a radially inner shoulder 20 on which is seated a flange portion 22 of a top mold insert 24. A stripper plate 26 is diposed beneath the top plate 16 where it is secured by a plurality of spaced apart retainers 28. A spring unit 30 for each retainer 28 serves to urge the stripper 26 into a normally downward position relative to the top plate 16.

The top insert 24 includes a slightly tapered, generally centrally disposed bore 32 having a frusto-conical top opening 34 therein, while the lower portion of the bore 32 is terminated by another frusto-conical, downwardly and inwardly directed, runner-defining surface 26. The lower portion of the top insert 24 includes a plurality of inwardly directed surfaces 38 which partially define the molding cavity generally indicated at 40, while a downwardly facing, generally annular land 42 serves as a lowermost portion of the top insert 24. A metal stamping generally designated 44 is adapted to be positioned within the mold and is shown to be of generally L-shaped form, having an axially extending flange 46 and a radially extending flange 48, it being understood that, as is common in oil seal practice, a rubber sealing lip will be bonded to at least portions of the radially extending flange 48.

Referring now to the lower mold assembly 14, it will be seen that a bottom plate 50 supports a compression spring 52 in a countersink 54 therein, with the upper surface 56 of the spring 52 acting against a spacer 58 having its upper surface in turn engaging the lower portion of a mold cure unit 60. Disposed generally centrally of the top portion of the core 60 is a recess 62 having slightly undercut or tapering side wall portions 64. The upper portion of the core unit 60 also includes a frusto-conical or tapered annular runner-forming surface 66 and includes plural generally outwardly directed surfaces 68 which are complementary, although not parallel, to the surfaces 38 of the upper insert 24 and which combine therewith and with a portion of the stamping 44 to define the molding cavity 40.

A shoulder portion 70 of the core unit 60 overlies an annular groove 72 which is shown to communicate by a passage 74 with a vacuum source schematically illustrated at 76. The shoulder 70 is seated on an upwardly directed surface 78 of a bottom insert 80, one portion 82 of which forms a seat or receiver for the radial flange 48 of the stamping, while a side wall portion 84 of a center ring 85 serves to engage the axially directed wall 46 of the stamping 44 and center the same relative to the core 60. A snap ring 86 is disposed in an annular groove around the bottom portion of the core unit 60, serving to limit upward movement of the core, while downward movement thereof is limited by interference between the shoulder 70 and the surface 78. The importance of this feature will appear presently herein. In the embodiment shown, the bottom insert 80 is held by a fastener 88 into a locked relation with the bottom plate 50.

Figure 2:
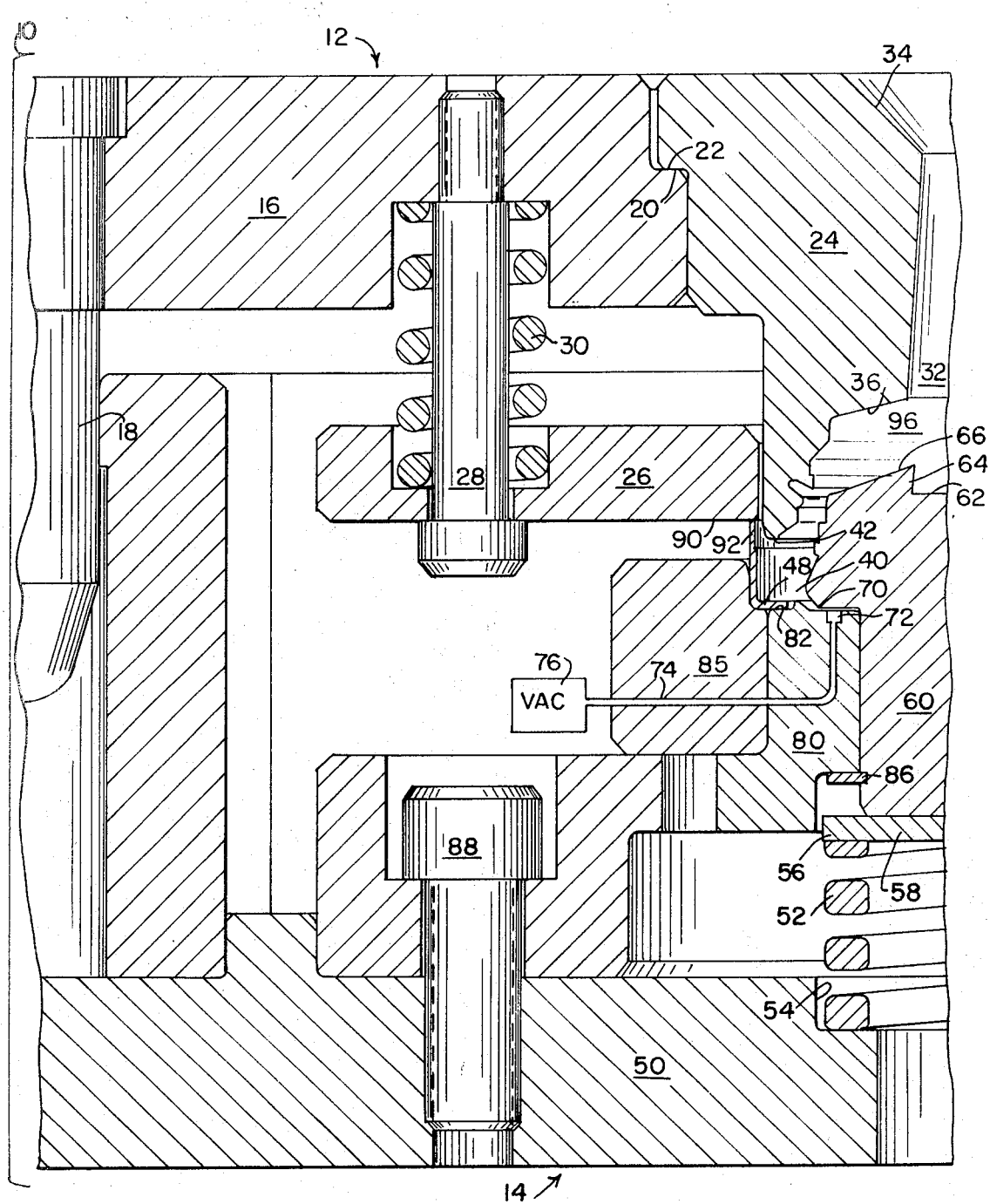
FIG. 2 is a vertical sectional view of the mold of FIG. 1, showing the same in a partially closed position.

Referring now in particular to FIG. 2, it will be noted that the stripper plate 26 has moved into a position such that the lower surface 90 thereof engages the top portion 92 of the stamping 46, firmly seating it against the surface 82. The spring 30 is not shown to be fully or significantly compressed, and the land 42 is still spaced apart from the upper surface of the radial flange 48 of the stamping 44. FIG. 2 shows that the shoulder portion 70 of the core unit 60 is spaced slightly apart from the annular surface 78, whereas the ring 86 is snugly engaged with a lower surface of the bottom insert 80, for reasons which will presently appear.

Referring now to FIG. 3, it will be noted that further downward movement of the top plate 16 and the top insert 24 has progressed to a degree sufficient that the land 42 engages the flange 48 of the stamping 44, thereby fully defining the molding cavity 40. The head of the fastener 28 is moved down, and the spring 30 is of the fastener 28 is moved down, and the spring 30 is strongly placed in compression, thereby continuing to exert a strong downward force on the stripper plate 26. The importance of this feature will also be referred to elsewhere herein.

Referring again to FIG. 3, it will be noted that there is still a slight working clearance between the shoulder 70 and the surface 78, and that, with the mold assembly 10 completely closed, initial flow of the rubber material 92 is beginning to occur within the bore 32. In this connection, it will be understood that a charge of rubber 92 is being injected from an injection nozzle or the like, only a fragment 94 of which is shown.

As also shown in FIG. 3, an annularly extending, disc-like generally frusto-conical runner 96 is shown, and it will be appreciated that this area, which, including the area 62, is circular in plan view, is defined by the opposed surfaces 36, 66. As best shown in FIG. 10, the surface 66 of the core 60 is of a slightly smaller angle of inclination with respect to the horizontal than is the surface 36 of the insert 24, with the result that, in the runner or passage 96, a gradual taper occurs. For reasons which will appear herein, a preferred form of this taper is such that, in any annular imaginary cross sectional ring of a given radial extent taken from runner 96. A constant volume of rubber will be disposed. In other words, in an imaginary radial ring of the passage or runner 96 which lies radially outward, such as ring R-1, the ring is of large diameter but decreased axial thickness, whereas, a ring of the same radial extent but of decreased diameter and hence lying closer toward the center of the runner, such as ring R-2, is of increased axial thickness.

Referring now to FIG. 4, the configuration of a typical oil seal forming cavity 40 is shown, as are the series of passages generally designated 98 through which the rubber material passes before entering the cavity. Thus, it will be noted that an annular rib 100 forms a portion of the cavity 40 which will act as the spring groove in the finished seal, and surfaces 102, 104 of the core unit 60 respectively form portions of the primary and secondary sealing lips.

The annular ridge 106 on the bottom insert 80 forms a re-entrant in the seal body radially outwardly of the secondary lip, while the other frusto-conical portion of the primary lip is formed by a short, inclined surface 108 on the mold core unit 60. The portion of the molding cavity which forms the so-called tear trim portion, or portion of the molded product from which the scrap will be separated, is generally designated 110. In the form of mold illustrated in FIG. 4, the reduced diameter tear trim area 110 is surmounted by a shoulder 112 formed on the lower portion of the top insert 24, and a shoulder 113 on the core 60. Accordingly, the finished product will include an annular ring 114 of uniform cross section and defined in part by a pair of lower shoulders 112, 113 terminating in the tear trim area 110. Above the ring 114 is a web generally designated 116, the construction of which will be described below.

Referring now to FIGS. 7 and 8, details of one form of mold core 60 and the portions of the upper insert 24 associated therewith are shown. Thus, it will be noted that the peripheral portion, generally designated 118, of the core 60 includes a plurality of relieved sections or "flats" 120 formed by chords extending between generally arcuate portions 122 of the core. Accordingly, numerous passages 124 of enlarged cross section extend between the flat surfaces 120 of the core 60 and the oppositely directed, axially extending annular surface 126 of the upper insert 24, while areas 128 of greatly reduced cross section lie between the arcuate mold core surfaces 122 and the annular surface 126 on the insert 24.

By reference to FIG. 8, it will be seen that, on the left, the passage 128 is extremely small, while the passage 124 on the right hand side is relatively large.

With this construction of the core 60, it will be appreciated that the surfaces 122 may serve to center the core 60, and hence the entire lower mold assembly 14, with respect to the upper mold assembly 12. Since only a working clearance of one, two or even fractional thousandths of an inch exists in these areas, rubber flow therethrough is minimal, while the centering action is quite accurate. On the other hand, the plurality of spaced apart passages 124 of enlarged cross section provide adequate area for rapid flow of fluent material into the ring or cavity 114 from which the material passes through the tear trim area 110 into the molding cavity 40. In this construction, the tear trim area 110 may be precisely made without danger of damage thereto when the mold parts register during closing, thereby permitting the so-called axial tear trim feature to exist in this construction. It will be appreciated that the areas 110 could not be precisely located unless the core 60 and the insert 14 are precisely positioned. In FIGS. 1–3, auxiliary or preliminary positioning pins 18 are shown, but it will be understood that the primary or final centering action results from the relatively precise fit of the core surfaces 122 within the insert surface 126.

Although the illustrated construction is preferred, it will be understood that the axial tear trim concept may be embodied in other molds if other equally precise centering means are provided. The reason that plural passages 124 are provided in this mold rather than one or two individual runners is that knit lines in the finished product are greatly reduced or eliminated. This is because the rubber may be kept in substantially a single mass and because it flows immediately into the collector ring 114 before passing into the cavity 40. This minimizes skin formation or surface cure, and is especiallly effective in cooperating with the single annular disc-like umbrella or diaphragm type runner 96.

Referring now to FIG. 9, an embodiment of the invention is shown wherein a pair of generally radially extending surfaces 130, 132 define therebetween a radially extending tear trim area 134 lying between portions of the core 60 and the upper insert 24. An annular dump or collector ring 136 is formed above shoulder 138 in the insert 24, while, in this embodiment, the runner 96 communicates around the entire periphery thereof with the collector ring 136. In this construction, the centering of the core 60 relative to the insert 24 need not be as precise as in the embodiment of FIGS. 7 and 8, whereas vertical registration determines the width of the tear trim and should therefore be fairly accurate.

Thus, the construction of FIG. 9 is preferred where vertical travel of the assemblies 12, 14 is preferred to be controlled; it is generally known that this is commonly the case, since placement of shims is all that is ordinarily necessary to fix this dimension. The shoulder 138 serves the same function in tearing the trim from the part as does its counterpart 112 in the embodiment of FIG. 4.

Referring now to FIGS. 10 and 11, different constructions of umbrella or diaphragm type runners 96 are shown, with the construction of FIG. 10 having a frusto-conical shape, and the construction of FIG. 11 and a flat or nearly flat construction. Although the diaphragms are shown to be tapered, this is not strictly necessary to the present invention. However, referring to the reason for the preference for the tapered constructions of these areas, the flow rate in the diaphragm area may thereby be easily controlled and made relatively constant. This insures that the dump rings or tear trim pockets 136, 114, and 110, for example, will receive charges of moldable material at substantially the same time and in substantially the same state of cure. It has been found that seals of improved uniformity may be made with these mold design features.

Referring now to FIGS. 1–6, and particularly to FIGS. 3–6, the significance of the spring 52, the ring 86 and the shoulder 70 and surface 78 may be appreciated. Although these features are not strictly necessary to the practice of the present invention, it has been found that they help substantially in producing quality seals. Thus, assuming the mold 10 has been closed and injection of the fluent rubber material 92 has started, as shown in FIG. 3, for example, it is desirable to evacuate the molding cavity 40 of air as well as gases generated in curing the rubber. Initially, this is rapidly accomplished through the line 74, since the ring 72 communicates with an area of substantial cross section lying between the shoulder 70 of the core 60 and the upper surface 78 of the insert 80. As the fluent material passes through the runner 96, the ring 114, and into the cavity 40 through the trim area 110, the volume of gas to be evacuated has substantially decreased, and the hydrostatic force on the upper surface 66 of the core 60 has greatly increased, especially when the leading edge portion of the charge of material 92 encounters the greatly reduced area tear trim section 110 of the mold. This hydrostatic force acts vertically against the spring 52, moving the entire core 60 downward, reducing the space between the shoulder 70, and surface 78 to approximately one thousandth or a fractional thousandth of an inch, and positioning the snap ring 86 slightly downwardly as shown in FIG. 5. In this position, a vacuum may still be maintained on the interior of the cavity, while the tight fit between the portions 70, 78 is sufficient to preclude the entry of a film of rubber scrap or flash into this area. Consequently, the parts are free from flash, and the vacuum passages in the mold are prevented from clogging or from filling with rubber so as to require subsequent cleaning.

Referring now to the tear trim features, it will be noted that, assuming the mold assembly 10 to be fully closed and formation of the seal "S" or like part to be completed, the mold is opened by initial downward movement of the bottom plate 50 and its associated parts, including the core 60. The radially enlarged portion 140 of the core 60 engages the finished part "S" as shown in FIGS. 5 and 6 and hence, continued downward movement of the core 60, the insert 80, and the ring 85 is accompanied by downward movement of the entire finished seal "S". This is further insured by a downward following movement of the stripper plate 26 under the influence of springs 30.

As a consequence, the shoulder 112, which remains fixed, along with the insert 24, tears the rubber in the tear trim area 110 from the finished part. However, since the walls 64 of the recess 62 are substantially tapered or undercut, the entire sprue (92 in FIG. 3) remains in place in the core 60 while the shank portion of the sprue 92 is withdrawn from the tapered cylindrical surface 32 in the insert 24. Thus, the sprue or scrap portion is exposed for removal by a picket of a type well known in the art and adapted to grasp the sprue just above the diaphragm 96. Removal of the sprue also occurs in the same manner in respect to the embodiment shown in FIG. 9; however, in this embodiment, the shoulder 138 engates the scrap portion of the rubber lying in the area of the ring 136, tearing it in the trim area 134.

Reference to the foregoing description, it will be appreciated that a number of features and methods are described for the production of improved seals, a number of which are preferably used in combination, but some of which are advantageously individually used. It has been discovered that the use of the molds and methods described has resulted in the production of high quality seal units capable of mass production in an reliable and economical manner.

It will thus be seen that the present invention provides a number of novel molding methods and apparatus having several advantages and characteristics, including those specifically pointed out herein and others which are inherent in the invention. Representative embodiments having been described by way of example, it will be understood that certain modifications and variations to the methods and apparatus specifically described herein will occur to those skilled in the art, and it is contemplated that these methods and apparatus may be made without departing from the spirit of the invention or the scope of the appended claims.

We claim:

1. A mold unit comprising, in combination, first and second mold elements movable relative to each other along a first, given axis, portions of said first and second elements disposed in generally facing relation and defining, at least in part, an annular article molding cavity having the shape of a part to be formed and a mold cavity inlet region, means in one of said elements for receiving in one end thereof a charge of fluent, moldable material from an associated injector and an outlet for directing said material toward said molding cavity, a circumferentially continuous transfer passage of thin cross section lying between said outlet and said mold cavity inlet region, said passage being defined by oppositely directed, closely spaced apart, generally parallel portions of said first and second elements extending generally radially outwardly from said charge-receiving means, the radially inner portion of said transfer passage being of greatly reduced cross section relative to the cross section of said charge-receiving means, said mold elements being arranged so that, when said mold elements are moved axially, said molding cavity and said transfer passage are opened for removal of said article and the scrap material found in said passage.

2. A mold unit as defined in claim 1 wherein said molding cavity is generally annular and wherein said periphery of said cavity is axially aligned with a major portion of said cavity.

3. A mold unit as defined in claim 1 wherein said passage is generally annular, said inlet being of cylindrical configuration and disposed generally perpendicular to the plane of said passage.

4. A mold unit as defined in claim 1 wherein said passage is of generally frusto-conical configuration.

5. A mold unit as defined in claim 1 wherein said passage is generally in the form of a flat, annular ring.

6. A mold unit as defined in claim 1 wherein said passage tapers toward a reduced axial dimension as the outer periphery thereof is approached.

7. A molding apparatus for fluent materials, said apparatus including inner and outer mold parts movable relative to each other along a given axis, each part having portions at least partially defining therebetween an article molding cavity, including inlet means for receiving fluent molding material, each of said parts also having generally axially extending, concentrically disposed, radially facing circumferentially continuous surfaces, said surfaces having registration portions thereof closely spaced radially apart from each other by a registration clearance and passage-defining portions spaced farther apart from each other so as to define therebetween passages of increased cross section communicating with said molding cavity inlet means, said passage-defining portions of said surfaces being also circumferentially spaced apart from one another, whereby said passages serve to provide relatively high volume flow of fluent material under injection forces to spaced apart inlet areas of said molding cavity, while simultaneously providing for concentric axial alignment of said mold parts.

8. An apparatus as defined in claim 7 wherein said passage-defining portion of said surfaces comprise flats forms on the surface of said inner mold part. formed 9. A molding apparatus as defined in claim 7 wherein said passageways extend axially of the movement axis of said mold parts.

10. A mold unit including inner and outer mold parts axially movable relative to each other and having portions thereof defining a molding cavity therebetween for forming a finished part, a mold cavity inlet passage extending around the entire periphery of said molding cavity, inlet means for receiving a charge of fluent, curable material generally centrally of said mold, a single passage extending from said charge-receiving inlet to said cavity inlet, and means on one of said movable mold parts lying axially outwardly of said molding cavity for positively engaging a portion of said cured material to cause separation of a part of said cured material from the finished part formed in said cavity when axial movement of said movable parts serves to move said finished part relative to one of said mold parts.

11. A mold unit as defined in claim 10 wherein one of said mold parts includes a portion for engaging a portion of said finished part received within said cavity to prevent relative axial movement thereof during movement of another mold part.

12. A mold unit as defined in claim 10 wherein a reduced thickness, axially extending passage is provided between said engaging means and said cavity inlet.

13. A mold unit as defind in claim 10 wherein a reduced thickness, radially extending passage is provided between said engaging means and said cavity inlet.

14. A mold unit comprising, in combination, at least three mold parts, said first and second mold parts having portions thereof defining therebetween an inlet passage for a fluent, curable material, said first mold part being arranged for movement relative to said third mold part, means urging said first part into a slightly axially spaced apart position from said third part for permitting flow of gas between said first and third parts, said first part having a large surface exposed to said charge of material, said surface extending at least partially perpendicular to the movement axis of said first part, said first and second parts forming means at least partially restricting flow of said material into said molding cavity, whereby forces on said large surface of said first part during material injection will move said part into a position more closely spaced apart from said third part.

15. A mold unit as defined in claim 14 wherein said third part includes means associated therewith for drawing a vacuum in said molding cavity.

* * * * *